Patented Feb. 11, 1941

2,231,623

UNITED STATES PATENT OFFICE 2,231,623

SYNTHETIC RUBBERLIKE MATERIALS

Bernard James Habgood, Rowland Hill, Elias Isaacs, and Leslie Budworth Morgan, Blackley, Manchester, England, assignors to Imperial Chemical Industries Limited, a corporation of Great Britain No Drawing. Application July 5, 1939, Serial No. 282,942. In Great Britain July 6, 1938

10 Claims. (Cl. 260—84)

This invention relates to the manufacture of synthetic rubberlike materials and more particularly to the interpolymerisation of butadiene-1:3 and its homologues with acrylates.

This invention has as an object to devise a new method of manufacturing synthetic rubberlike materials. A further object is to provide new synthetic rubberlike materials. A further object is to devise a method of manufacturing synthetic rubber-like materials which can be compounded and vulcanised to give products resembling vulcanised rubber, but having greater resistance to oils and solvent. A still further object is to provide new synthetic rubberlike materials which can be compounded and vulcanised to give products resembling vulcanised rubber, but having greater resistance to oils and solvents. A still further object is to provide new materials resembling vulcanised rubber but having greater resistance to oils and solvents. Further objects will appear hereinafter. These objects are accomplished by the following invention.

We have found that a mixture of butadiene-1:3 and methyl $\beta$-(2-furyl)acrylate may be polymerised together, in aqueous emulsion, to yield polymerisates which after coagulating and drying, are similar to natural rubber in their physical properties, and which may be compounded and vulcanised to give products resembling vulcanised rubber, but having greater resistance to oils and solvents.

Methyl homologues of butadiene-1:3 and other esters of $\beta$-(2-furyl)acrylate may be used with similar results. As methyl homologues of butadiene-1:3, we mention especially isoprene and 2:3-dimethylbutadiene-1:3. Methyl and ethyl esters of $\beta$-(2-furyl)acrylic acid, especially the former, are the most convenient esters to use for the purpose of obtaining economically good rubber-like materials of good to very good resistance to oils and solvents. Esters other than methyl and ethyl may be used, especially the lower unsubstituted alkyl esters. Esters of other kinds than alkyl may also be used, for instance chloroalkyl esters such as $\beta$-chloroethyl, hydroxyalkyl esters such as $\beta$-hydroxyethyl, alkoxyalkyl esters such as $\beta$-ethoxyethyl, aralkyl esters such as benzyl and aryl esters such as phenyl. Those of low molecular weight, i. e., those derived from alcohols and phenols of low molecular weight, are in general preferred, because they are more economically obtainable.

The proportions in which the materials to be polymerised are to be used depend upon the individual compounds chosen, but in general more butadiene-1:3 or methylbutadiene-1:3 than ester is to be used.

The emulsions of the butadiene-1:3 or methylbutadiene-1:3 and ester may be made by agitating them with water and an emulsifying agent. Frequently the emulsification and polymerisation may be conveniently effected together, in what may be regarded as a single technical operation, if the ingredients of the mixture are emulsified by agitating them at a temperature at which polymerisation takes place and then agitation continued long enough for the polymerisation to be effected. Cetyl p-dimethylaminobenzoate methosulphate is a suitable emulsifying agent to use, but other salts derived from bases with long aliphatic chains and inorganic or organic acids, or salts derived from high molecular weight organic acids and inorganic bases may be used instead. Small proportions of one or more electrolytes e. g., acetic acid or acetic acid mixed with sodium acetate may be conveniently used in the emulsion. Other ingredients may be included, namely agents which catalyse polymerisation, such as organic and inorganic peroxides, and agents which modify or assist the course of the polymerisation, such as aliphatic compounds containing chlorine directly united to carbon, e. g., carbon tetrachloride.

The products of polymerisation are produced in latex-like form. They may be obtained in massive form by coagulating the latex, separating the coagulum, washing and drying. The coagulation may be effected by known methods, e. g., by freezing, or by the addition of sodium chloride, sodium hydroxide, ethyl alcohol, or mixtures of these, depending upon the emulsifying agent, which has been employed. Washing and drying may be effected on heated rollers in a rubber roller mill which is furnished with a device for washing, e. g., a water spray.

$\beta$-(2-furyl)acrylic esters, may be made by esterifying $\beta$-(2-furyl)acrylic acid by the usual esterification methods.

The dry materials may be vulcanised by compounding and heating, in a manner similar to that employed with natural rubber. Compounding may be effected with, for example, filling and reinforcing ingredients such as carbon black and zinc oxide, with or without sulphur and accelerators. The cured products are better than vulcanised natural rubber in their resistance to oils and hydrocarbon solvents.

The resistance to oils and solvents depends upon the proportion of the ester incorporated in the original monomer mixture. In general it is desirable to use at least 20% and preferably more than 30% based on the total polymerisable material present in order to obtain a good resistance to oils and solvents. If more than 40% is employed the vulcanisate possesses a rather low resilience, but otherwise it is an excellent oil resisting product being practically unaffected by immersion in Diesel oil. We have also found that the products having the highest oil and solvent resistance are obtained by polymerisations, which are stopped short of very good yield.

The following examples, in which parts are by weight, illustrate but do not limit the invention.

Example 1

400 parts of water, 16 parts of cetyl P-dimethylaminobenzoate methosulphate, 22 parts of 6% acetic acid, 25 parts of methyl β-(2-furyl) acrylate and 50 parts of butadiene-1:3 are agitated in a stainless steel autoclave at 60° C. for 4 days. The resulting latex is coagulated by adding ethyl alcohol and the coagulum washed with water on a rubber roller mill, and dried by heating the rolls. A very good yield of a rubberlike material is obtained.

Example 2

The rubberlike material obtained according to Example 1, is included in the following mixing:

| | Parts |
|---|---|
| Rubberlike material | 100 |
| Gas black | 50 |
| Zinc oxide | 10 |
| Stearic acid | 2 |
| Mercaptobenzthiazole | 1 |
| Sulphur | 2 |
| Product of condensation of acetaldehyde and α- and β-naphthylamines according to British Specification 280,661 | 1 |

The mix is cured for 60 minutes at 141° C. A tough resilient vulcanisate is obtained, with good resistance to oils and solvents.

Example 3

310 parts of water, 106 parts of an aqueous paste containing 15% of sodium cetyl sulphate, 25 parts of methyl β-(2-furyl) acrylate and 50 parts of butadiene-1:3 are subjected to the polymerizing conditions described in Example 1.

A good yield of rubberlike material is obtained.

A similar product is obtained if isoprene is used instead of butadiene-1:3.

Example 4

If ethyl β-(2-furyl) acrylate is used instead of the corresponding methyl ester, in Example 1, a very good yield of a similar rubberlike material is obtained. On compounding and vulcanizing this rubberlike material as in Example 2, a resilient vulcanizate is obtained, which has very good resistance to the swelling action of oils and solvents.

Example 5

If n-butyl β-(2-furyl) acrylate, (B. P. 146-147/18 mm.) is used instead of the corresponding methyl ester in Example 1 and 5 parts of carbon tetrachloride are also used in the polymerization mixture, a very good yield of rubberlike material is obtained. The product when compounded and vulcanized as described in Example 2 gives a resilient oil-resisting material.

Example 6

The ester described in Example 5 is replaced by β-chloroethyl β-(2-furyl) acrylate (B. P. 120-22° C./4 mm.).

A very good yield of rubberlike product is obtained. When the product is compounded and vulcanized, as described in Example 2, it yields a vulcanisate, which is very resistant to oils and solvents.

Example 7

400 parts of water, 16 parts of cetyl p-dimethylaminobenzoate methosulphate, 22 parts of 6% acetic acid, 20 parts of carbon tetrachloride, 27.5 parts of methyl β-(2-furyl) acrylate and 47 parts of butadiene-1:3 are subjected to the procedure described in Example 1.

A good yield of a rubberlike material is obtained, which after compounding and vulcanizing as described in Example 2 gives a vulcanisate which only swells to a small extent in oils.

A similar product is obtained if 2:3-dimethylbutadiene-1:3 is used instead of butadiene-1:3.

By using β-ethoxyethyl β-(2-furyl) acrylate (B. P. 140–141° C./4 mm.) instead of ethyl β-(2-furyl) acrylate in Example 5, a good yield of rubberlike product is obtained, and this when compounded and vulcanized as in Example 2 gives a good resilient oil-resisting vulcanisate.

If benzyl-β-(2-furyl) acrylate (B. P. 158-160° C./3 mm.) is used instead of β-ethoxyethyl β-(2-furyl) acrylate a similar product is obtained.

As many apparently widely different embodiments of this invention may be made without departing from the spirit and scope thereof, it is to be understood that the invention is not limited to the specific embodiments thereof except as defined in the appended claims.

We claim:

1. Process for the manufacture of new synthetic rubberlike materials which comprises polymerizing, in aqueous emulsion, an ester of beta-(2-furyl) acrylic acid together with a member of the group consisting of butadiene-1,3 and its methyl homologues.

2. Process for the manufacture of new synthetic rubberlike materials which comprises polymerizing, in aqueous emulsion, a lower unsubstituted alkyl ester of beta-(2-furyl) acrylic acid together with butadiene-1,3.

3. Process for the manufacture of new synthetic rubberlike materials which comprises polymerizing, in aqueous emulsion, methyl beta-(2-furyl) acrylate and butadiene-1,3.

4. Process for the manufacture of new synthetic rubberlike materials which comprises polymerizing, in aqueous emulsion, ethyl beta-(2-furyl) acrylate and butadiene-1,3.

5. An interpolymer of an ester of beta-(2-furyl) acrylic acid and a member of the group consisting of butadiene-1,3 and its methyl homologues.

6. An interpolymer of an ester of beta-(2-furyl) acrylic acid and a member of the group consisting of butadiene-1,3 and its methyl homologues, the latter material being present in larger amounts than the former material.

7. Process for the manufacture of new synthetic rubberlike materials which comprises polymerizing, in aqueous emulsion, an ester of beta-(2-furyl) acrylic acid together with a member of the group consisting of butadiene-1,3 and its methyl homologues and compounding and curing the rubberlike material thus obtained.

8. Process for the manufacture of new synthetic rubberlike materials which comprises polymerizing, in aqueous emulsion, a lower unsubstituted alkyl ester of beta-(2-furyl) acrylic acid together with butadiene-1,3 and compounding and curing the rubberlike material thus obtained.

9. Cured synthetic rubberlike material wherein the rubberlike ingredient is an interpolymer of an ester of beta-(2-furyl) acrylic acid together with a member of the group consisting of butadiene-1,3 and its methyl homologues.

10. Cured syntheic rubberlike material wherein the rubberlike ingredient is an interpolymer of a lower unsubstituted alkyl ester of beta-(2-furyl) acrylic acid together with butadiene-1,3.

BERNARD JAMES HABGOOD.
ROWLAND HILL.
ELIAS ISAACS.
LESLIE BUDWORTH MORGAN.